Nov. 26, 1957      K. H. BURGSMÜLLER      2,814,236

METHOD AND APPARATUS FOR THREAD CHASING

Filed Aug. 22, 1951      3 Sheets-Sheet 1

INVENTOR.
KARL HEINRICH BURGSMÜLLER
BY
*James J. Cannon*
ATTORNEY

KARL HEINRICH BURGSMÜLLER
INVENTOR.

BY *James J. Cannon*
ATTORNEY

Nov. 26, 1957  K. H. BURGSMÜLLER  2,814,236
METHOD AND APPARATUS FOR THREAD CHASING
Filed Aug. 22, 1951  3 Sheets-Sheet 3

INVENTOR.
KARL HEINRICH BURGSMÜLLER
BY James J. Cannon
ATTORNEY

2,814,236
METHOD AND APPARATUS FOR THREAD CHASING

Karl Heinrich Burgsmüller, Kreiensen am Harz, Niedersachsen, Germany, assignor to Gomerue Etablishment, Vaduz, Liechtenstein Application August 22, 1951, Serial No. 243,141

2 Claims. (Cl. 90—11.42)

This invention relates to certain improvements in or relating to the machining, more particularly of cylindrical workpieces by the undulating cutting method. The tool is moved at a high frequency and relatively high cutting speed, against a slowly moving workpiece, and with every strike of the tool a short chip only will be removed. This method has several advantages over conventional methods in that the efficiency and the service life of the tool is greatly increased because by guiding the tool on its cutting path so that continually different parts of its cutting face are exposed to the cutting pressure and heating, the resulting heat is distributed over a larger area of the cutting face of the tool.

This variation in exposure of the said cutting face may be achieved, for instance, by passing the cutting face of the tool through the workpiece in such a way that the chip is removed from the workpiece at a continually varying angle. To this end the tool may be passed over the cutting surface at a non-uniform speed.

By way of alternative, the tool may be moved in such a way that the cross section of the chip being removed is continually changing.

My novel method of moving the cutting tool at a varying speed has the added advantage of letting the tool pass through its idle path at a greater speed than through its cutting path.

An important feature of the present invention is that the effective cooling of the rapidly moving tool, depends on the length of the air path traversed by the tool rather than on the time period during which the tool is moved through the cooling air, on its idle or return path.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 1:
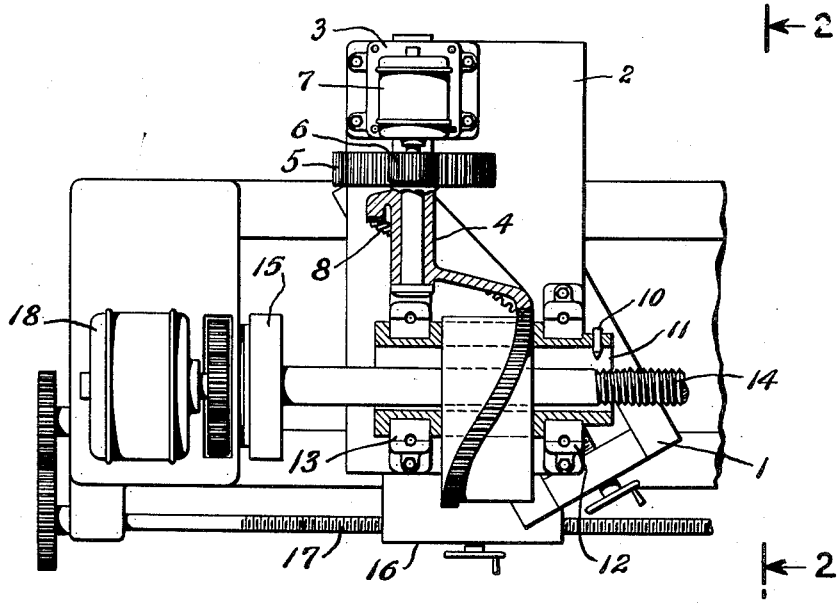
Figure 2:
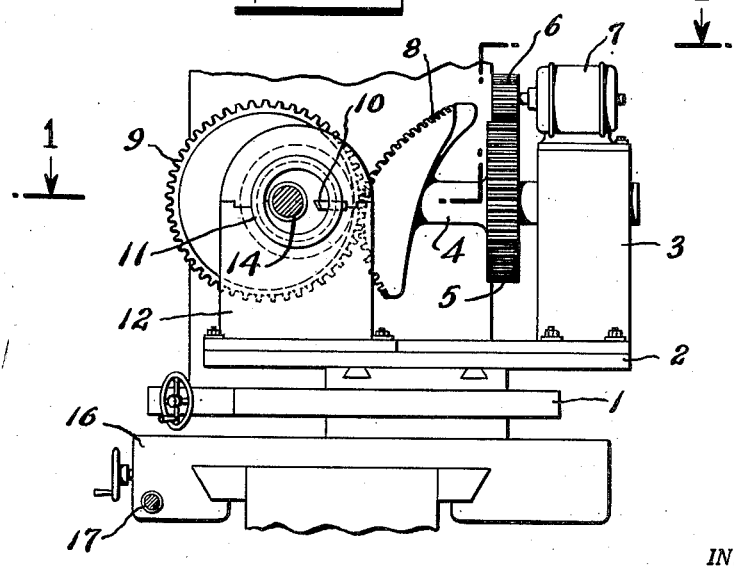
Figure 3:
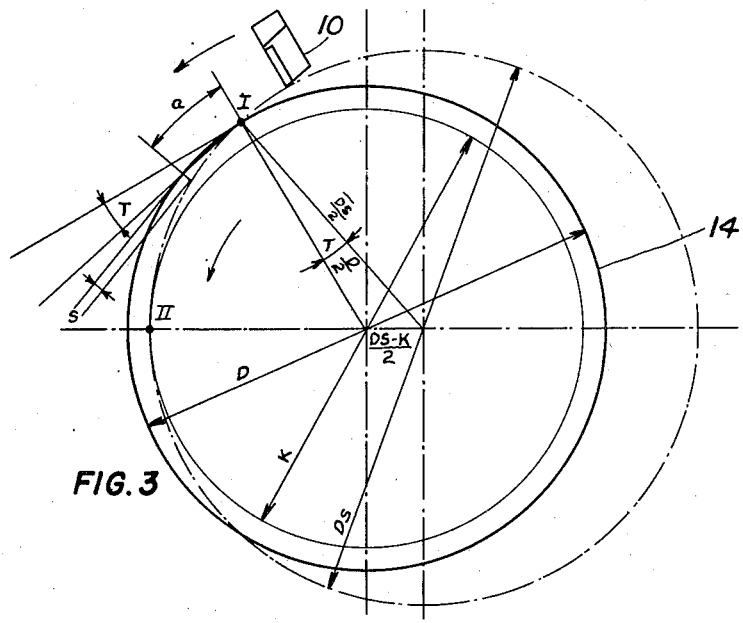
Figure 4:
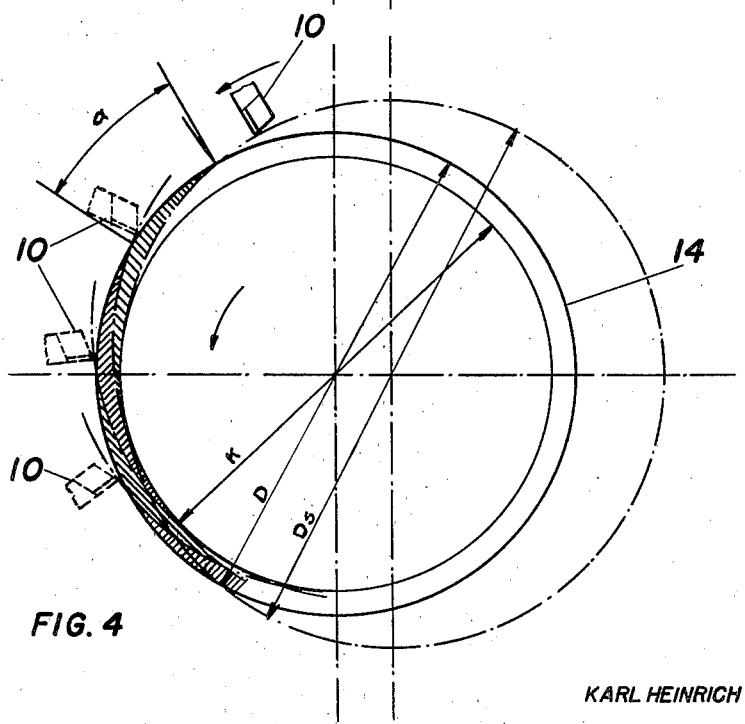
Figure 5:
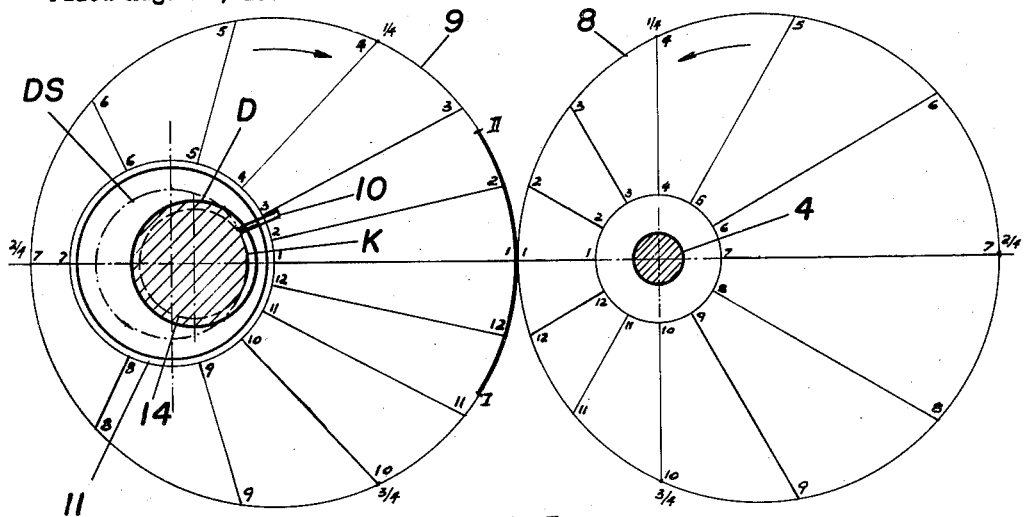
Figure 6:
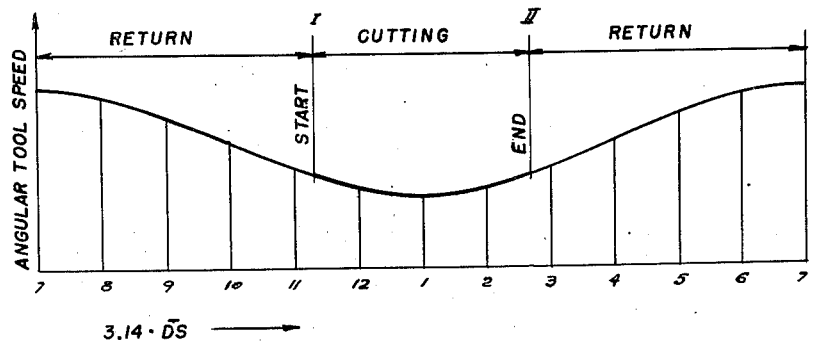

Fig. 1 is a partial plan view of a device for cutting outside threads according to my invention, Fig. 2 is a side view of the device shown in Fig. 1, partly in section, Fig. 3 is a diagrammatic cross-section showing the path of the tool in relation to the workpiece, Fig. 4, similar to Fig. 3 showing several consecutive cuts, or chips, removed from the workpiece by the tool, Fig. 5 shows diagrammatically the relative speed of the tool during its rotation around the workpiece, and its momentary position relative to the driving wheel, Fig. 6 is a graph showing the momentary speeds of the tool during one full revolution.

Similar reference numerals denote similar parts in the different views.

Referring to the drawings, particularly to Figs. 1 and 2, a pillow block 3 for a horizontal shaft 4 is mounted on a plate 2 carried by the lathe slide rest 1. Gear 5 is keyed to the shaft 4 said gear 5 serving simultaneously as a flywheel and meshing with the pinion 6 of a motor 7 carried by said pillow block 3. A gear 8 shaped similar to a wobble plate is mounted on shaft 4 and meshes with a gear 9 mounted eccentrically on a hollow shaft 11 serving as a holder for a cutting tool 10. Said shaft 11 is mounted at right angles to a gear 8, in bearings 12, 13 supported by plate 2. Workpiece 14 held in chuck 15 is positioned eccentrically to the circular path of the tool point. The slide rest 1 is fixably mounted in conventional manner on the carriage 16 of the lathe and is moved together with said carriage 16 by lead screw 17 in an axial direction of the workpiece 14 driven by motor 18.

In operation tool 10 rotates eccentrically to the axis of workpiece 14 at the maximum permissible cutting speed through about one-quarter of the periphery of the workpiece 14 shown more particularly in the diagram Fig. 3. After completing the cut, tool 10 proceeds during its idle path through the air to the next cut. The path of the point of tool 10 around the workpiece 14 is described by a circle with the diameter DS, D designates the major diameter and K the minor diameter of the thread on workpiece 14. It can be seen in the diagram Fig. 3, tool 10 strikes the periphery of workpiece 14 at point I on the major diagram D, and continues its cut tangentially and also radially down to the minor diameter K, when it leaves the workpiece 14 at point II. The angle of the chip removed is T at the starting point I and diminishes to zero at point II. While tool 10 is rapidly rotating eccentrically around workpiece 14, the latter is rotating around its own axis and advances for the next cut by an amount "a" shown in diagram Fig. 3 and is designated as the peripheral feed from cut to cut.

From the small triangle shown in heavy outline in the diagram Fig. 3, which can be regarded approximately as one with straight sides, the peripheral feed from cut to cut or for each revolution of tool 10 around workpiece 14 is derived as $$a = \frac{s}{\sin T}$$

$s$ designates the chip thickness. From the law of cosines, angle T is derived from $$\cos T = \frac{D^2 + 2K\overline{DS} - K^2}{2D \times \overline{DS}}$$

evaluating T and substituting sin T the numerical value of $a$ is obtained by selecting the chip thickness $s$ which is dependent on the type of material to be cut and on the fineness of the finish desired along the sides of the thread, similar as in conventional thread cutting on a lathe.

In Fig. 4 is shown diagrammatically several consecutive cuts showing the form of chip removed in cross-section. In practical operation the peripheral feed $a$ is very small and is measured in a few thousandths of one inch because the rotational speed of tool 10 is very high in comparison to the rotational speed of workpiece 14. The cuts follow rapidly in close succession producing a smooth thread groove. While workpiece 14 is rotating slowly the lead screw 17 of the lathe moves carriage 16 (as shown in Figs. 1 and 2) with the thread cutting device and with it also tool 10 in an axial direction of workpiece 14 and thus producing a helix or a screw thread as in a conventional manner.

Figures 3 and 4 indicate further that the angle at which the chip is removed is continually changing due to the eccentricity of the tool point circle DS to the workpiece 14. It is also known that the angle at which the chip flows from a workpiece varies with the relative speed of the tool. This combination greatly benefits the tool because concentrations of intensive strains on a small cutting surface are thus minimized.

Reading on diagram Fig. 5, shaft 4 and gear 8 rotate at a constant angular velocity. The peripheral speed of gear 8 because of its eccentricity is variable. Point 1 shown in the diagram having the slowest peripheral speed and point 7 being furtherest from the axis travels at the highest peripheral speed. Gear 9 with tool 10 and tool holder ring 11 is driven by gear 8 at a variable peripheral speed and gear 9 which is also mounted eccentrically gives tool 10 and tool holder ring 11 an additional variation to its angular velocity thus increasing the ratio between the cutting speed and return travel speed of tool 10.

It can be seen in diagram Fig. 5 that tool 10 engaging workpiece 14 is about halfway through its cut, while gears 8 and 9 mesh at point 1. The cut having started at point 4 on the tool holder ring 11 when gears 8 and 9 mesh at point I near point 11. The cut is completed when tool 10 reaches point 1 on the tool holder ring with gears 8 and 9 meshing at point II between points 2 and 3. By selecting a larger or smaller tool point circle DS the engaging points I and II of tool 10 on workpiece 14 can be varied.

After leaving point 1 tool 10 gains in angular velocity and attaining its greatest speed when gears 8 and 9 mesh at point 7. From this point on tool 10 diminishes its speed until near point 4 it engages workpiece 14 again at the normal cutting speed.

The graph of Fig. 6 shows the momentary peripheral speeds of tool 10 in its travel around workpiece 10, cutting cycle and return cycle are indicated, said speed of rotation is non-uniform. After completing the cut, tool 10 proceeds during its idle path through the air at a substantially higher speed than during its cutting path. The transition of speed between the cutting path and the idle path is continuous rather than abrupt. Due to the higher speed of the tool during its idle path the cutting tool will perform a higher number of cuts per unit of time, thus resulting in an increased production.

Solving the problem of driving the tool 10 at a variable speed, can be accomplished by either electrical or hydraulic means.

It will be understood that while the invention is of primary importance for a device or attachment for the machining of cylindrical workpieces by means of a tool rotating at a high speed relative to the rotational speed of the workpiece and striking the workpiece only during part of its rotational path, under certain conditions it may be used to advantage for other kinds of cutting work.

While the invention has been described in detail with respect to certain now preferred examples and embodiments of the invention it will be understood by those skilled in the art after understanding the invention that various changes and modifications may be made wtihout departing from the spirit and scope of the invention and it is intended, therefore, to cover all such changes and modifications in the appended claims.

What I claim is:

1. Means for intermittently moving a cutting tool into and out of cutting relationship with a work-piece at a differential speed, comprising in combination, a circular tool holder ring, means mounting said holder ring for rotation about the axis of its circle, a cutting tool mounted adjacent the periphery of the circle, a sinusoidally shaped gear mounted eccentrically on said tool holder ring, a wobble plate shaped gear its axis set at right angle to the axis of said tool holder ring and meshing with said sinusoidally shaped gear and means for driving said wobble plate gear.

2. The method, as herein described, for cutting threads on a workpiece, with a single cutting tool rotating rapidly at a variable rate of speed eccentrically around said workpiece, and moving said cutting tool longitudinally, parallel to the axis of said workpiece, in the conventional manner for thread cutting, said cutting tool engaging said slowly rotating workpiece intermittently over a small portion only with a continually varying cutting angle due to said eccentricity and due to said changing relative speed between workpiece and tool, and removing a short chip of variable cross-section cutting to the full depth of the thread being cut, during each cutting cycle of said tool effecting a continuous thread groove as a result of the minute angular advancement of said workpiece and the longitudinal advancement of said tool during each revolution of said tool around said workpiece.

References Cited in the file of this patent

UNITED STATES PATENTS

| | | |
|---|---|---|
| 743,293 | Knight | Nov. 3, 1903 |
| 1,507,235 | Hall | Sept. 2, 1924 |
| 1,642,120 | Matthews | Sept. 13, 1927 |
| 1,888,792 | Cottrell | Nov. 22, 1932 |
| 2,029,385 | Perkins | Feb. 4, 1936 |

FOREIGN PATENTS

| | | |
|---|---|---|
| 43,802 | Switzerland | Mar. 23, 1908 |
| 491,956 | France | Feb. 25, 1919 |